United States Patent [19]

Aiuola

[11] Patent Number: 4,629,055
[45] Date of Patent: Dec. 16, 1986

[54] APPARATUS FOR ARRANGING CONTAINERS E.G. BOTTLES, VERTICALLY

[75] Inventor: Franco Aiuola, Bologna, Italy

[73] Assignee: Azionaria Costruzioni Macchine Automatiche (A.C.M.A.), Bologna, Italy

[21] Appl. No.: 691,778

[22] Filed: Jan. 16, 1985

[30] Foreign Application Priority Data

Jan. 24, 1984 [IT] Italy .................. 3317 A/84

[51] Int. Cl.[4] .......................... B65G 47/24
[52] U.S. Cl. ................. 198/400; 198/412
[58] Field of Search ............. 198/400, 398, 406, 407, 198/456, 412, 413, 414

[56] References Cited

U.S. PATENT DOCUMENTS 4,146,124  3/1979  Krooss .................. 198/456

Primary Examiner—Joseph E. Valenza
Assistant Examiner—Kyle E. Shane
Attorney, Agent, or Firm—Alan N. McCartney

[57] ABSTRACT

Apparatus is described for arranging containers (1) e.g. bottles vertically, comprising an entry unit, sets of rod-shaped guides (23,24,25) helically shaped and symmetrical relative to the vertical longitudinal plane of the apparatus, and two belts (16) symmetrical and adjacent to such plane, which engage the initially uppermost side of the container. Operating in unison with and having the same speed as the lower branches of said two belts (16) are, firstly, the upper branch of an auxiliary belt (26), underneath said two belts (16), followed by inwardly facing branches of two subsidiary belts (31), symmetrical in relation to said plane and almost horizontal, so that the side of the container which is originally lowermost is continuously engaged by firstly the upper branch of the auxiliary belt (26) and then by the inwardly facing branch of one or the other of such subsidiary belts (31). This construction gives more reliable operation, especially at high speeds, then previously known apparatus.

3 Claims, 5 Drawing Figures

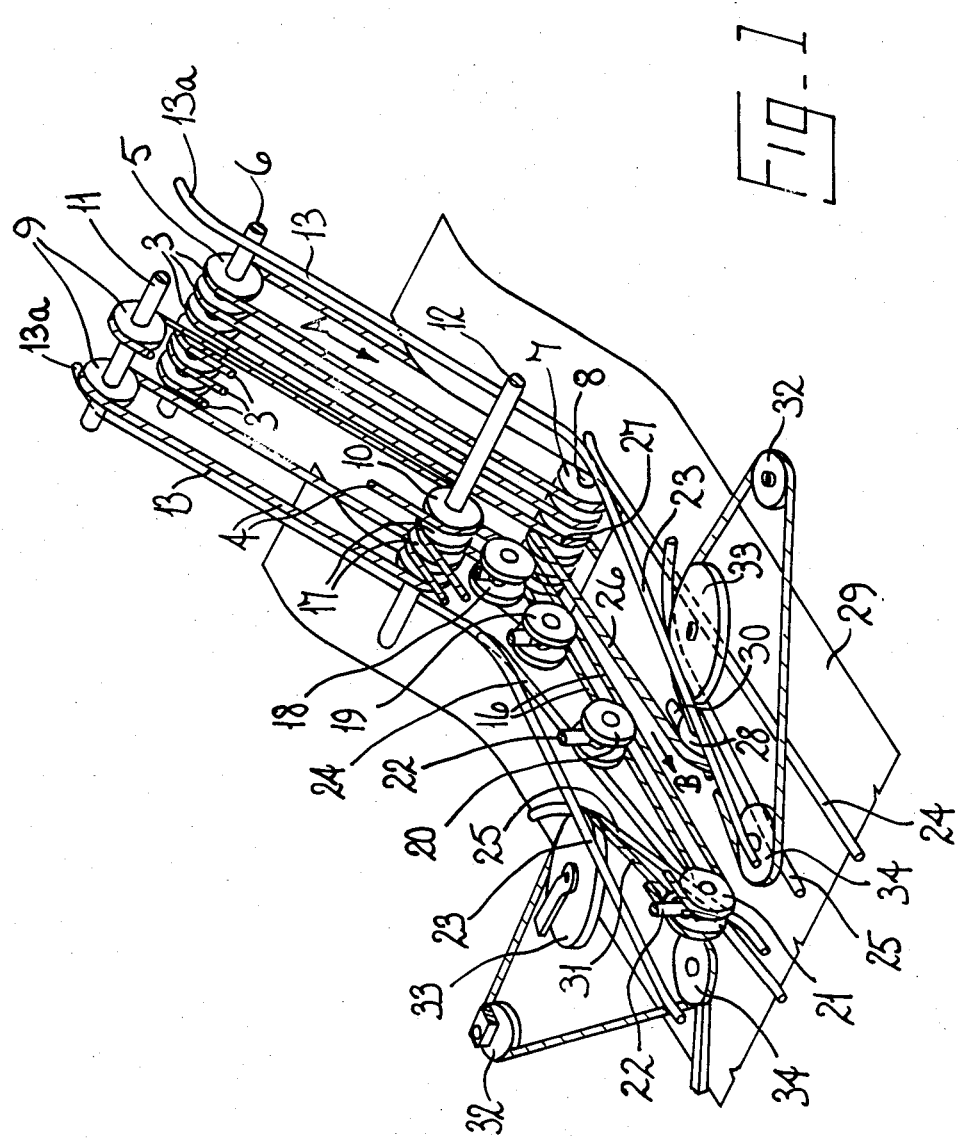

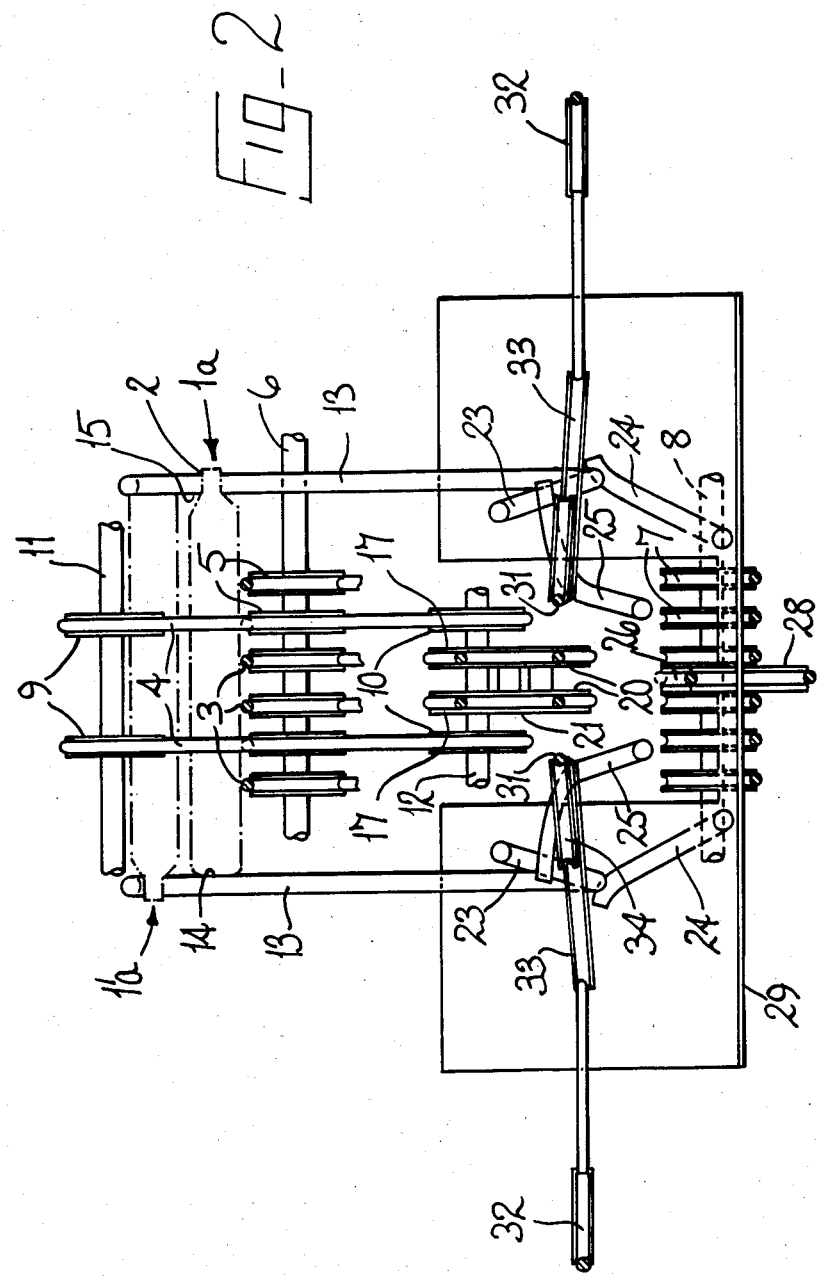

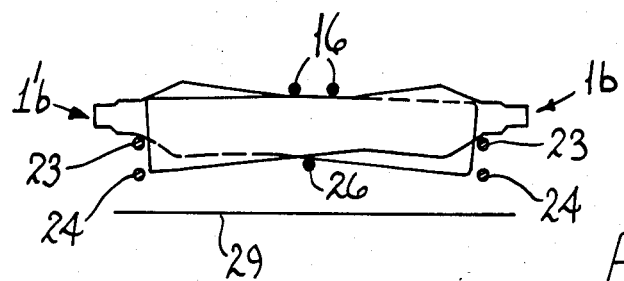
Fig_3
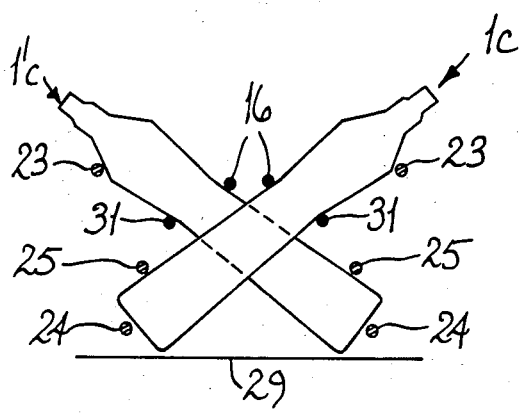
Fig_4
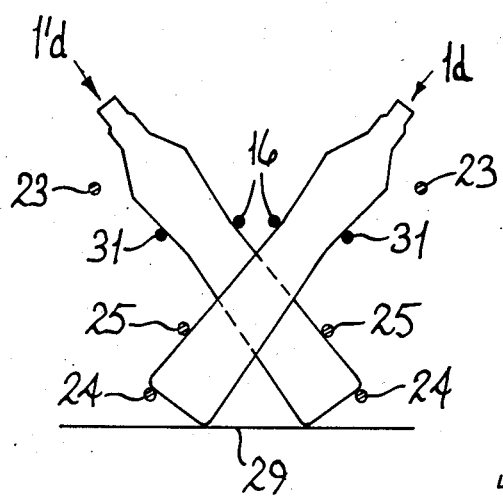
Fig_5

APPARATUS FOR ARRANGING CONTAINERS E.G. BOTTLES, VERTICALLY

FIELD OF THE INVENTION

The present invention relates to apparatus for arranging containers, for example bottles, phials and similar articles, vertically, especially in plants in which liquids of various types are bottled in flat, elongated containers made of plastic.

BACKGROUND TO THE INVENTION

Initially such containers are empty and haphazardly disposed in a container from which they are discharged with their axes disposed horizontally. The containers are then fed forward lying on their sides with their axes transverse to the direction in which they are travelling, their necks being, at random, on either one side or the other of said direction. In this way the containers successively arrive at apparatus which is intended to arrange them with their axes vertical, each with its neck facing upwards.

An entry unit of such apparatus consists of two sets of belts, one above the other, and two lateral guides and conveys the containers downwardly. The containers are gripped between upper and lower branches of the belts of the two sets, which are adjacent and which move in unison at the same speed and each container is constrained between the lateral guides with its neck resting on one of these guides and its body (that is the part between the bottom and shoulders from which the neck of the container projects) against the other.

In apparatus previously known the containers, from such an entry unit, are then carried by a dragging action along two sets of rod-shaped guides, which are specially shaped in substantially helical form and are symmetrical in relation to a vertical longitudinal plane of the apparatus, two of said rod-shaped guides constituting an extension of said two lateral guides. The containers are propelled along these rod-shaped guides by lower branches of two belts, which are symmetrical and adjacent to said longitudinal plane and, like the rod-shaped guides, have a circular cross-section.

Each container is firstly laid on its side and its uppermost side is engaged from above by said two belts. Then, as it slides on said sets of guides, the container is rotated and raised and this uppermost side, depending on which way the neck of said container is pointing, is selectively engaged by the side of one or the other of the two belts. When operating correctly the progressive rotation of the container takes place in vertical planes transverse to the apparatus and in one or other direction, by reason of which the neck of the container assumes an upwardly facing orientation and the side which was originally uppermost moves towards the longitudinal plane and reaches a vertical position.

However, in previously known apparatus it is not uncommon for containers to rotate not only in vertical transverse planes, but also horizontally; this causes obstruction of the apparatus and is mainly attributed to the fact that the transport effected by the two belts is not always positive. The lightness of plastic containers and the presence of dirt on the guides and belts can cause variations in the frictional engagement of the belts and container. It can therefore be seen that this known apparatus is unreliable in operation, especially if it is intended to reach high operating speeds.

OBJECTS OF THE INVENTION

An object of the present invention is therefore to provide improved apparatus for arranging containers vertically, which is reliable and capable of working at high speeds.

Preferred apparatus according to the invention is structurally simple, easy to produce and durable in its working.

SUMMARY OF THE INVENTION

There is hereinafter described apparatus embodying the invention, intended for arranging containers, e.g. bottles, vertically and comprising an entry unit having two sets of belts disposed one above the other and two lateral guides determining a path for the transport of the containers lying transverse to the path on their sides, two sets of helically shaped guides disposed symmetrically in relation to a vertical longitudinal plane of the apparatus, two of said guides constituting an extension of the two lateral guides, and two belts disposed symmetrically to and adjacent to said plane and intended, initially together with lower faces of the belts and then one or the other selectively with the side face of the belt, to engage the originally uppermost part of the wall of the container, characterised in that the apparatus further comprises an auxiliary belt having an upper branch disposed underneath said two belts and in said plane, the upper branch of the auxiliary belt being arranged, in the operation of the apparatus, to travel at the same speed as the lower branches of said two belts and to cooperate with the lower branches to engage a container, and two subsidiary belts, following the auxiliary belt disposed symmetrically in relation to said plane with substantially horizontal inwardly facing branches of the subsidiary belts being arranged, in the operation of the apparatus, to travel at the same speed as the lower branches of said two belts and to cooperate with the lower branches to engage a container, the construction and arrangement being such that the container wall which is originally uppermost is continuously engaged by said lower branches, while the originally lower wall of the container is continuously engaged firstly by the upper branch of the auxiliary belt and then by the inwardly facing branch of one or, selectively, the other of the subsidiary belts.

BRIEF DESCRIPTION OF THE DRAWINGS

There now follows a detailed description, to be read with reference to the accompanying drawings, of apparatus for arranging containers vertically embodying the invention. It will be realised that this apparatus has been selected for description to illustrate the invention by way of example not of limitation of the invention and that the invention may reside in any novel feature of the apparatus singly or in combination with other features.

In the accompanying drawings:

FIG. 1 is a diagrammatic perspective view of apparatus embodying the invention;

FIG. 2 is a diagrammatic front elevation of the apparatus; and

FIGS. 3, 4 and 5 show the progressive rotation of containers.

DESCRIPTION OF THE PREFERRED EMBODIMENT

The apparatus shown in the drawings is used to arrange empty containers vertically and with their necks facing upwards. Containers lying on their sides arrive successively and with their axes arranged transverse to the direction in which they are being fed. Containers 1 in this condition are indicated (FIG. 2) by 1a and 1′a, their necks 2 facing either to the right or to the left. Each container is of a flattened shape and made of plastic material. The entry unit of the apparatus is generally similar to those used in previously known apparatus and has two sets of belts, disposed one about the other. There are six lower belts 3 and two upper belts 4 in the apparatus shown in the drawings. The belts 3 engage respective traction pulleys 5 and are all keyed to the same shaft 6 which is disposed horizontally and transversely of the apparatus. They also engage respective driven pulleys 7, keyed to a single shaft 8 which is parallel to the shaft 6 but at a lower level. Upper branches of the belts 3, which are driven branches, are moved in a direction A (see FIG. 1) and downwardly inclined. Overlying lower branches of the belts 4, also driven branches, travel in unison and at the same speed as the upper branches of the belts 3. Traction pulleys 9 and driven pulleys 10 of the belts 4 are respectively keyed on shafts 11, 12 disposed above the shafts 6, 8. The containers 1a, 1′a are gripped between the lower branches of the belts 4 and the upper ones of the belts 3 which together exert a dragging action and thus the containers are positively propelled downwardly, keeping their orientation. The containers in fact remain centred in relation to the belts by virtue of two lateral guides 13, which also form part of the entry unit. These guides 13 are of circular cross-section like the belts 3, 4 and commence with lead-in sections 13a for the containers. The guides 13 are disposed at an intermediate level between the upper branches of the belts 3 and the lower branches of the belts 4 and extend parallel to and outwardly of the branches. Depending on the side towards which the neck 2 of a container is facing, the neck 2 rests on one of the guides 13. The part of the container between its base 14 and its shoulders 15 from which the neck 2 projects then remains constrained between the guides 13.

Following the entry unit, in a commonly known construction, the apparatus has two belts 16, which are symmetrical and adjacent to the vertical longitudinal plane of the apparatus. The belts 16 are driven by respective pulleys 17, which are keyed to the shaft 12, between the pulleys 10. From the pulleys 17 the driven lower branches of the pair of belts 16 slope downwardly and pass over a pair of idler pulleys 18 from which they proceed, substantially horizontally guided by pairs of idler pulleys 19, 20. They then rise gradually and finally pass round a pair of pulleys 21. Idler pulleys 18, 19 and 20 and pulleys 21 are carried at lower end portions of associated rod-like supports 22, which pass between the two upper branches of belts 16 and are fixed at upper end portions to the framework of the apparatus.

Symmetrical to said longitudinal vertical plane are disposed in known manner sets of rod-shaped guides of circular section and helically shaped in a particular way: two of such guides 23 constitute an extension of the guides 13. Such sets further include two guides 24 and two guides 25, below guides 23.

In the longitudinal plane in the apparatus shown in the drawings there is an auxiliary belt 26, the drive pulley 27 for which is keyed on to shaft 8 in a central position in relation to pulleys 7. The driven pulley 28 of belt 26, also underneath belts 16, is arranged a little in front of idler pulley 20. The upper driven branch of the auxiliary belt 26 proceeds at the same speed as and in unison with the lower branches of the belts 16 in a direction B (FIG. 1): the upper branch of the belt 26 actually moves, gradually, slightly away from the lower branches of the belts 16. The upper branch of the belt 26 is spaced slightly above a horizontal platform 29 which has a slot 30 through which the pulley 28 projects.

Two subsidiary belts 31 of the apparatus, shown in the drawings are disposed, generally downstream of the belt 26, symmetrically in relation to said longitudinal plane and are almost horizontal. Driven branches of these belts face inwardly of the apparatus and travel slightly upwards and also gradually approach belts 16, in the direction of travel, i.e. in direction B. Each subsidiary belt 31, which has the same speed as belts 16 and 26, follows a triangular path. At the outer vertex of this triangular path is a horizontal traction pulley 32 of the belt; on the axle of this horizontal pulley a further pulley (not shown) is keyed; the further pulley is driven from an end of shaft 8 by an associated semi-crossed transmission belt (also not shown). At the other vertices of the triangle are pulleys 33, 34, slightly inclined; the large pulley 33 is substantially aligned with the idler pulley 20 whilst the pulley 34 is slightly further forward than the pulley 21. Belts 31, like belts 16 and 26, are circular in section.

In the operation of the apparatus described the container 1b or 1′b which (FIG. 3) emerges lying on its side and in a transverse position from the two sets of superimposed belts 3, 4, is dragged positively and continuously, firstly by belts 16, 26 and then by one of said belts 16 and a corresponding one of the belts 31. The dragging action is selectively carried out by one or the other of the adjacent pairs of belts 16, 31, according to the orientation of the neck 2 of the container. Thus the side, which in the recumbent container was initially uppermost, is at first engaged by the face of the belts 16 at the bottom of the lower branches of both belts 16 and then by the face at the outer side of one of such branches; on the other hand the, originally, lower side of the container is firstly engaged by the upper branch of the belt 26 and then by the branch, facing inwards, of one of the belts 31. With the cooperation of the two symmetrical sets of helical guides 23, 24 and 25 and of the platform 29 the container propelled in this way gradually passes from the condition 1b (or 1′b) (FIG. 3) to that of 1c and 1d (or 1′c and 1′d) of FIGS. 4 and 5 and then emerges from the belts 16, 31 with its base 14 resting on the platform 29, its neck 2 facing upwards and the side which initially was uppermost, vertical and virtually in the longitudinal plane of the apparatus. The container can then be removed by suitable means, and proceed towards bottling.

Even at high transportation speeds, the containers engaged by the belts and by the guides on both their opposing sides gradually rotate in a correct manner, without causing any obstruction of the device. Account must also be taken of the adaptability which the active branches of the belts possess, all being driven belts. Obviously, the materials used, as well as shapes and dimensions, will all be chosen according to requirements.

Having thus described my invention and the manner in which it is to be preformed what I claim as new and desire to secure by Letters Patent of the United States of America is:

1. Apparatus for arranging containers of a type such as bottles and the like, vertically, which comprises an entry unit having two sets of belts disposed one above the other and two lateral guides determining a path for the transport of containers lying transverse to the path on their sides, two sets of helically shaped guides disposed symmetrically in relation to a vertical longitudinal plane of the apparatus, two of said guides constituting an extension of said two lateral guides, and two belts disposed symmetrically to and adjacent to said plane and having lower branches intended, initially together with lower faces of the belts and then one or the other selectively with the side face of the belt, to engage the originally uppermost part of the wall of the container, the apparatus further comprising an auxiliary belt having an upper branch disposed underneath said two belts and in said plane, the upper branch of the auxiliary belt being arranged, in the operation of the apparatus, to travel at the same speed as the lower branches of said two belts and to cooperate with the lower branches to engage a container therebetween, and two subsidiary belts following the auxiliary belt disposed symmetrically in relation to said plane with substantially horizontal inwardly facing branches of the subsidiary belts being arranged, in the operation of the apparatus, to travel at the same speed as the lower branches of said two belts and to cooperate with the lower branches to engage a container, said inwardly facing branches being angularly disposed to the horizontal plane of said two belts, and inclined with respect to the horizontal plane of said two belts, the construction and arrangement being such that the container wall which is originally uppermost is continuously engaged by said lower branches, while the originally lower wall of the container is continuously engaged firstly by the upper branch of the auxiliary belt and then by the angularly disposed inwardly facing branch of one or selectively, the other of the subsidiary belts so that said subsidiary belts raise the containers vertically while being retained between said two belts and said auxiliary belt or said subsidiary belts.

2. Apparatus according to claim 1, wherein the lower branches, upper branch and inwardly facing branches are all driven branches of the respective belts.

3. Apparatus according to claim 1 wherein said upper branch, in the direction in which it is travelling, gradually diverges from said two lower branches while, on the other hand, in the direction in which they are travelling, and symmetrically, the two inwardly facing branches gradually converge with the lower branches.

* * * * *